(12) United States Patent
Namiranian et al.

(10) Patent No.: US 9,736,661 B2
(45) Date of Patent: Aug. 15, 2017

(54) HANDLING OF MESSAGES IN A PARTIALLY DEPLOYED IMS NETWORK

(71) Applicant: T-Mobile USA, Inc., Bellevue, WA (US)

(72) Inventors: Babak Namiranian, Bothell, WA (US); Sasikala Mannepally, Bothell, WA (US); Nilesh Ranjan, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 72 days.

(21) Appl. No.: 14/231,523

(22) Filed: Mar. 31, 2014

(65) Prior Publication Data
US 2015/0281923 A1    Oct. 1, 2015

(51) Int. Cl.
*H04W 4/14* (2009.01)
*H04W 8/04* (2009.01)
*H04L 29/06* (2006.01)
*H04L 12/58* (2006.01)

(52) U.S. Cl.
CPC .......... *H04W 4/14* (2013.01); *H04L 65/1016* (2013.01); *H04L 65/1073* (2013.01); *H04L 51/38* (2013.01)

(58) Field of Classification Search
CPC ... H04L 12/5895; H04L 51/38; H04L 51/066; H04L 65/105; H04L 65/1016; H04W 4/14; H04W 8/18; H04W 88/182; H04W 92/02
USPC .......................... 455/433, 466; 370/252, 253
See application file for complete search history.

(56) References Cited

U.S. PATENT DOCUMENTS

| | | | | |
|---|---|---|---|---|
| 7,929,683 B1* | 4/2011 | Tran | ........................ | H04W 8/26 379/221.01 |
| 2005/0282565 A1* | 12/2005 | Shaheen | .................. | H04W 4/14 455/466 |
| 2007/0123277 A1* | 5/2007 | Harris | ..................... | H04W 4/14 455/466 |
| 2008/0089290 A1* | 4/2008 | Coulas | ................ | H04W 76/068 370/331 |

(Continued)

FOREIGN PATENT DOCUMENTS

EP    1998526 A1    12/2008

OTHER PUBLICATIONS

3GPP, "Support of Short Message Service (SMS) over generic 3GPP Internet Protocol (IP) access; Stage 2 (Release 12)", retrieved from <<http://www.3gpp.org/DynaReport/23204.htm>>, 3GPP TS 23.204 V12.4.0, Dec. 17, 2013, 61 pages.

(Continued)

*Primary Examiner* — Erica Navar
(74) *Attorney, Agent, or Firm* — Lee & Hayes, PLLC (57) ABSTRACT

A device associated with a subscriber database of a telecommunication network described herein is configured to receive a Send Routing Information for Short Message (SRI-SM) message from a messaging center. The device then determines whether a user device specified by the SRI-SM message is associated with an Internet Protocol (IP) Multimedia Subsystem (IMS) registration. In response to determining that the user device is associated with an IMS registration, the device sends the SRI-SM message to an IP Short Message Gateway (IP-SM-GW). In response to determining that the user device is not associated with an IMS registration, the device processes the SRI-SM message and responds to the messaging center based on the processing.

14 Claims, 4 Drawing Sheets

(56) References Cited

U.S. PATENT DOCUMENTS

2008/0259870 A1* 10/2008 Olvera-Hernandez ............................ H04L 67/147 370/331
2011/0080905 A1    4/2011 Greene et al.
2014/0003411 A1    1/2014 Shaheen

OTHER PUBLICATIONS

Huawei, "Enhancement of IP-SM-GW", retrieved from <<http://www.3gpp.org/ftp/tsg_sa/WG2_Arch/TSGS2_54_Sophia_Antipolis/Docs/>>, S2-062767, 3GPP TSG SA WG2 Architecture—S2#54, Sophia Antipolis, France, Aug. 19, 2006, 8 pages.
PCT Search Report and Written Opinion mailed Jun. 30, 2015 for PCT Application No. PCT/US15/22659, 13 Pages.

* cited by examiner

HANDLING OF MESSAGES IN A PARTIALLY DEPLOYED IMS NETWORK

BACKGROUND

Internet Protocol (IP) Multimedia Subsystem (IMS) networks play a key role in the transition from networks supporting circuit-switched communications to those providing packet-switched communications. Many telecommunications network providers have partially deployed IMS networks with only a subset of their subscribers being capable of utilizing the IMS networks, and only a portion of those capable being registered to do so.

Standard Bodies, such as the Third Generation Partnership Project (3GPP), however, assume in their specifications that all subscribers will be IMS registered. For example, 3GPP Specification 23.204 assumes that every user is an active IMS subscriber and states that all Send Routing Information for Short Message (SRI-SM) messages should be routed to an IP Short Message Gateway (IP-SM-GW), which then queries a Home Location Register (HLR) or Home Subscriber Server (HSS) via an additional SRI-SM. In a telecommunications network where not all of the subscribers have active IMS registrations, however, much of this messaging between an IP-SM-GW and the HLR/HSS will be unnecessary.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques for determining, by a device associated with a subscriber database of a telecommunications network, whether a user device specified by an SRI-SM message is associated with an IMS registration and handling that SRI-SM message accordingly. In some embodiments, the device may be an HLR or HSS of the telecommunications network. The device may receive the SRI-SM message from a messaging center, such as a Short Message Service Center (SMSC). In response to determining that the user device is associated with an IMS registration, the device sends the SRI-SM to an IP-SM-GW for further handling. If the device determines that the user device is not associated with an IMS registration, the device processes the SRI-SM message locally and responds to the SRI-SM message. In a number of embodiments, when the device determines that the user device is associated with an IMS registration, the device then determines, based on a setting, whether to use a preconfigured IP-SM-GW or the IP-SM-GW that the user is registered at. The device then sends the SRI-SM to the determined IP-SM-GW.

Determining whether a user device is associated with an IMS registration may involve any one or more of a number of determinations, such as whether the user device is IMS capable or whether the user device is associated with an active IMS registration. In various embodiments, the determining may include determining, by the device, whether a setting indicates that the user device is associated with an IMS registration. The setting may be adjusted in response to an IMS registration by the user device and may be reset based on a timer component. The timer component may be used to determine whether a time since a most recent IMS registration exceeds a threshold. If the time exceeds the threshold, the device may reset the setting to indicate that the user device is not associated with an IMS registration.

Overview

Figure 1A:
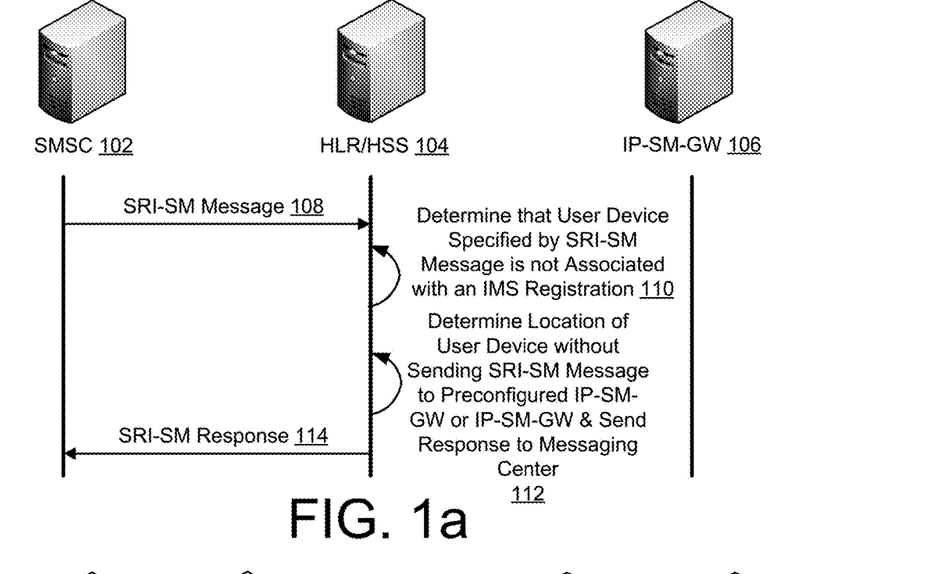
FIGS. 1a-1b illustrate example interaction diagrams showing a device associated with a subscriber database of a telecommunications network, the device being configured to receive an SRI-SM message from a messaging center, to determine whether a user device specified by the SRI-SM message is associated with an IMS registration, and to either process the SRI-SM message and respond to it or send the SRI-SM message to an IP-SM-GW based on the determination.
Figure 1B:
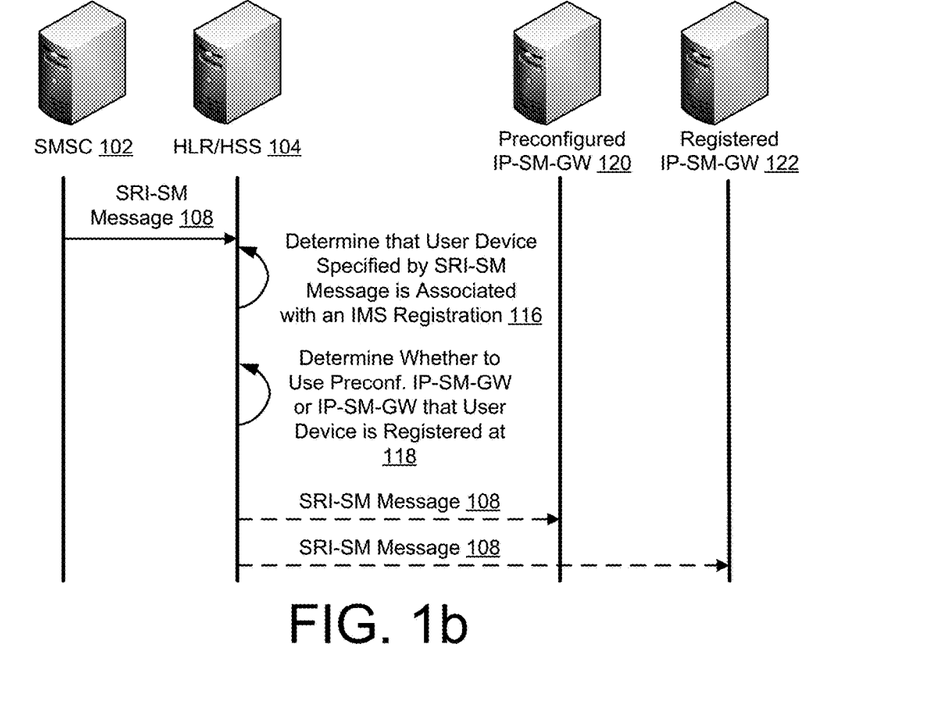

FIGS. 1a-1b illustrate example interaction diagrams showing a device associated with a subscriber database of a telecommunications network, the device being configured to receive an SRI-SM message from a messaging center, to determine whether a user device specified by the SRI-SM message is associated with an IMS registration, and to either process the SRI-SM message and respond to it or send the SRI-SM message to an IP-SM-GW based on the determination. As illustrated in FIGS. 1a-1b, multiple devices of a telecommunications network are connected to each other and communicate with each other. Each device is represented in FIGS. 1a-1b by a graphic of an example of the device and by a vertical line. The communications between these devices are shown by solid horizontal lines between the vertical lines representing the devices. When two alternative communications are shown, they are represented as dashed horizontal lines. Operations performed on a single device that do not involve communication are represented by arcs.

FIG. 1a shows an example messaging center of the telecommunications network—an SMSC 102—communicating with a HLR/HSS 104 of the telecommunications network. FIG. 1a also shows an IP-SM-GW 106 of the telecommunications network, which is not involved in the communications between the SMSC 102 and HLR/HSS 104. The SMSC 102, HLR/HSS 104, and IP-SM-GW 106 may each be any sort of computing device, such as a personal computer (PC), a laptop computer, a workstation, a server system, a mainframe, a server farm, or any other computing device. Also, modules and data of the each of the SMSC 102, HLR/HSS 104, and IP-SM-GW 106 may be implemented in a single computing device or disturbed among multiple computing devices. An example of the HLR/HSS 104 is illustrated in greater detail in FIG. 3 and is described in detail below with reference to that figure. Also, as mentioned, the SMSC 102, HLR/HSS 104, and IP-SM-GW 106 are part of a telecommunications network. An example of such a telecommunications network is illustrated in greater detail in FIG. 2 and is described in detail below with reference to that figure.

In various embodiments, the SMSC 102 may be any sort of messaging center. The SMSC 102 may store, forward, convert and deliver SMS messages for the telecommunications network. Upon receiving an SMS message from a first user device that is destined for a second user device, the SMSC 102 may store the SMS message for delivery once the second user device is available. To deliver the SMS message to the second user device, the SMSC 102 needs to discover the location of the second user device. Thus, the SMSC 102 then sends an SRI-SM message 108 to the HLR/HSS 104 requesting the location of the second user device.

The HLR/HSS 104 may be the HLR/HSS 104 serving the second user device. HLR/HSS 104 may be a central database that contains the details, including location, of each subscriber of the service provider of the telecommunications network. The first and second user devices may be subscribers of different telecommunications service providers or the same telecommunications service provider. The HLR/HSS 104 is the HLR/HSS of the core telecommunications network of the service provider providing service to the second user device.

In a partially or completely deployed IMS network which is 3GPP compliant, the HLR/HSS 104 is to forward the SRI-SM 108 to an IP-SM-GW, such as IP-SM-GW 106, which is to act as the domain selector. The IP-SM-GW 106 then sends a return SRI-SM message to the HLR/HSS 104, requesting packet-switched and circuit switched domain information which is stored by the HLR/HSS 104. The reason for this is that the IP-SM-GW 106 would have the information needed to route an SMS message over the IMS domain when the second user device is associated with an IMS registration. If delivery over IMS fails, then delivery is respectively attempted over the packet-switched and circuit-switched domains.

In contrast, in FIG. 1a, rather than simply relaying the SRI-SM 108 to an IP-SM-GW, the HLR/HSS 104 determines, at 110, whether the second user device is associated with an IMS registration. The determination may simply involve determining whether the second user device is IMS capable. Alternatively or additionally, the determining may involve determining whether the second user device is associated with an active IMS registration. In some embodiments, the HLR/HSS 104 may maintain a setting for each user device of its telecommunications service provider. That setting may indicate whether that user device is associated with an IMS registration. Thus, in such embodiments, the determining, at 110, may include examining the setting for the second user device. In some embodiments, the setting can be adjusted on a per subscriber or subscriber group basis.

In further embodiments, the HLR/HSS 104 may also include a timer component which tracks the times since most recent IMS registrations for the user devices. When a time since a most recent IMS registration for a user device exceeds a threshold, the setting for that user device is reset to indicate that the user device is no longer associated with an IMS registration.

In FIG. 1a, the HLR/HSS 104 determines that the second user device is not associated with an IMS registration. Rather than relaying the SRI-SM message 108 per the 3GPP standard, the HLR/HSS 104 then processes, at 112, the SRI-SM message 108 itself and determines the location of the second user device. The HLR/HSS 104 then sends an SRI-SM response 114 to the SMSC 102. The SRI-SM response 114 may include the location of the second user device, and the SMSC 102 may then use that location to deliver the stored SMS message.

FIG. 1b illustrates the opposite result of the determining, at 110, shown in FIG. 1a. In FIG. 1b, the HLR/HSS 104 receives the SRI-SM message 108 from the SMSC 102 and determines, at 116, that the second user device is associated with an IMS registration. The HLR/HSS 104 then determines, at 118, which IP-SM-GW to use. As shown in FIG. 1b, rather than a single IP-SM-GW 106, there may be multiple IP-SM-GWs, such as a preconfigured IP-SM-GW 120 and an IP-SM-GW 122 that the second user device is registered at (hereinafter the "registered IP-SM-GW"). The preconfigured IP-SM-GW 120 may be an IP-SM-GW selected by the telecommunications service provider associated with the HLR/HSS 104 to serve as the domain selector.

To determine, at 118, whether to use the preconfigured IP-SM-GW 120 or the registered IP-SM-GW 122, the HLR/HSS 104 may consult another setting maintained by the HLR/HSS 104. The other setting can be adjusted on a per subscriber or subscriber group basis. In such embodiments, the setting indicative of whether the second user device is associated with an IMS registration may be first setting and the other setting, which indicates whether to use the preconfigured IP-SM-GW 120 or the registered IP-SM-GW 122, may be a second setting. If the second setting indicates that the preconfigured IP-SM-GW 120 should be used, the HLR/HSS 104 sends the SRI-SM message 108 to the preconfigured IP-SM-GW 120. If the second setting indicates that the registered IP-SM-GW 122 should be used, the HLR/HSS 104 sends the SRI-SM message 108 to the registered IP-SM-GW 122. The IP-SM-GW 120/122 then processes the SRI-SM message 108, determining or obtaining the location of the second user device. The IP-SM-GW 120/122 then sends an SRI-SM response that includes the location to the SMSC 102. The SMSC 102 then uses the location to deliver the SMS message to the second user device.

In some embodiments, if the IP-SM-GW 120/122 is unaware of the IMS registration associated with the second user device, the IP-SM-GW 120/122 may send a second SRI-SM message to the HLR/HSS 104 to obtain domain information from the HLR/HSS 104, include packet-switched and circuit-switched domain information.

Example Environment

Figure 2:
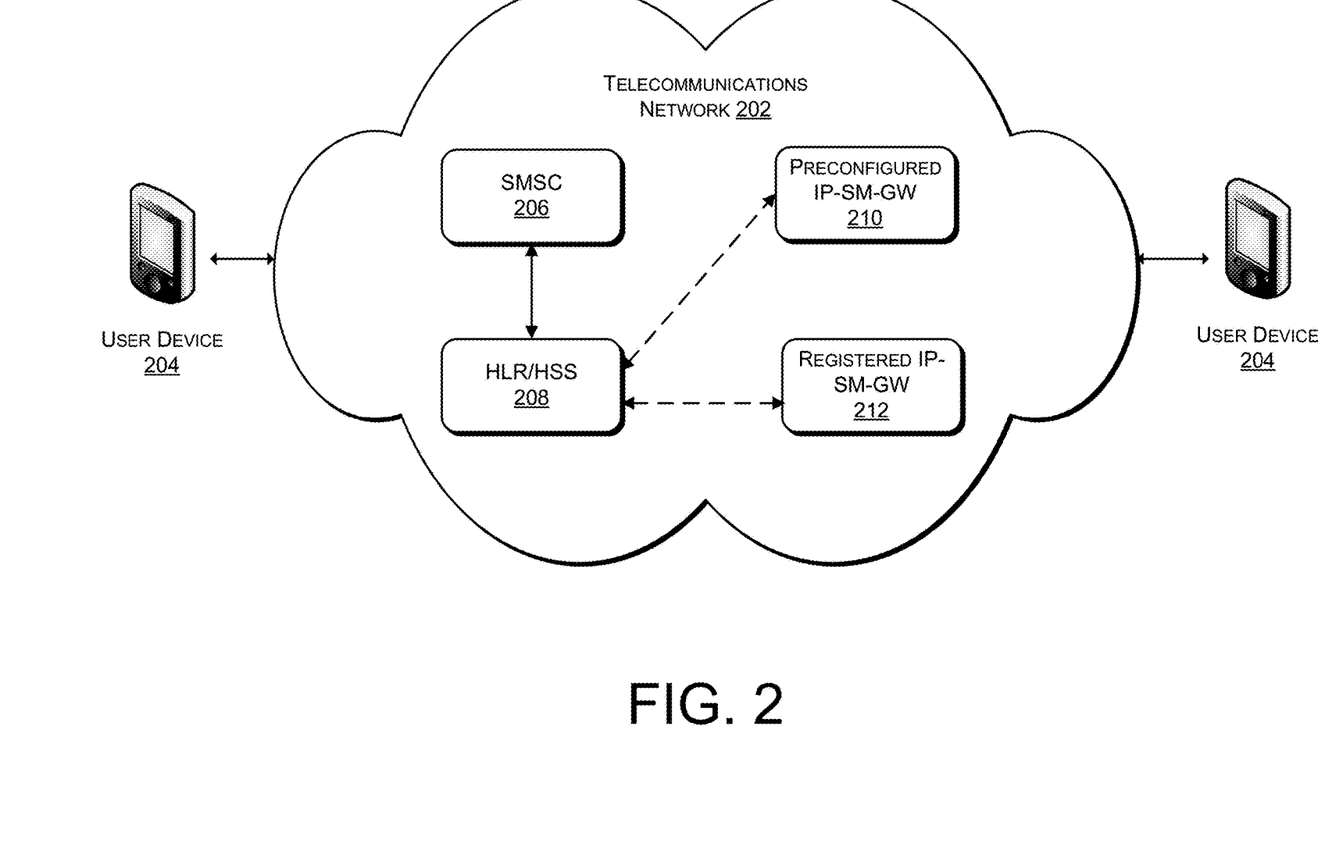
FIG. 2 illustrates an example environment which includes user devices engaged in messaging over a telecommunications network and devices of that telecommunications network, including a device associated with a subscriber database, a messaging center, and IP-SM-GWs.

FIG. 2 illustrates an example environment which includes user devices engaged in messaging over a telecommunications network and devices of that telecommunications network, including a device associated with a subscriber database, a messaging center, and IP-SM-GWs. As illustrated, a telecommunication network 202 is connected to two user devices 204 and enables those user devices 204 to engage in messaging, such as SMS messaging. The telecommunication network 204 may include an SMSC 206 for the exchange of SMS messages, an HLR/HSS 208 to store information about users of one or both of the user devices 204, and one or more IP-SM-GWs, such as a preconfigured IP-SM-GW 210 or a registered IP-SM-GW 212, to act as a domain selector for the message exchange.

In various embodiments, the user devices 204 may each be any sort of telecommunications device, such as a smart phone, a cellular phone, a personal digital assistant (PDA), a personal computer (PC), a laptop, a desktop, a workstation, a media player, a gaming device, a television, a media center, or the like. Each user device 204 may provide its user with facilities to send and receive SMS messages, MMS messages, or the like. Either or both of the user devices 204 may also be IMS capable and may be associated with an IMS registration, which may be active or inactive. If inactive, the user device 204 may register with an IMS network of the telecommunications network 202. The registration may subsequently be lost and then later reinitiated.

The telecommunications network 202 may include one or more telecommunications networks of telecommunications service provider(s) to which users of either or both of the user devices 204 subscribe for services. The telecommunications network 202 may include a core network for each telecommunication service provider and one or more access networks. Such access networks may include base stations, node Bs, eNode Bs, radio network controllers (RNCs), etc. and may enable circuit-switched connections, packet-switched connections, or both. The access networks may also or instead include access points, such as WiFi access points, which connect to the core network(s) of the telecommunications network 202 through public or private packet networks.

The core network(s) of the telecommunications network 202 may include at least the SMSC 206, the HLR/HSS 208, either or both of the preconfigured IP-SM-GW 210 or the registered IP-SM-GW 212, and components of an IMS network. The core network(s) of the telecommunications network 202 may also include any of a gateway general packet radio service (GPRS) support node (GGSN), a serving GPRS support node (SGSN), or a policy control rules function (PCRF) node. These devices may be implemented as any one or more computing devices, such as PCs, laptop computers, workstations, server systems, mainframes, server farms, or any other computing devices. In various embodiments, the capabilities and interactions of the SMSC 206, HLR/HSS 208, preconfigured IP-SM-GW 210 and registered IP-SM-GW 212 may be the same as or similar to the capabilities and interactions of the SMSC 102, HLR/HSS 104, IP-SM-GW 106, preconfigured IP-SM-GW 120, and registered IP-SM-GW 122, which are described above in greater detail.

Example System

Figure 3:
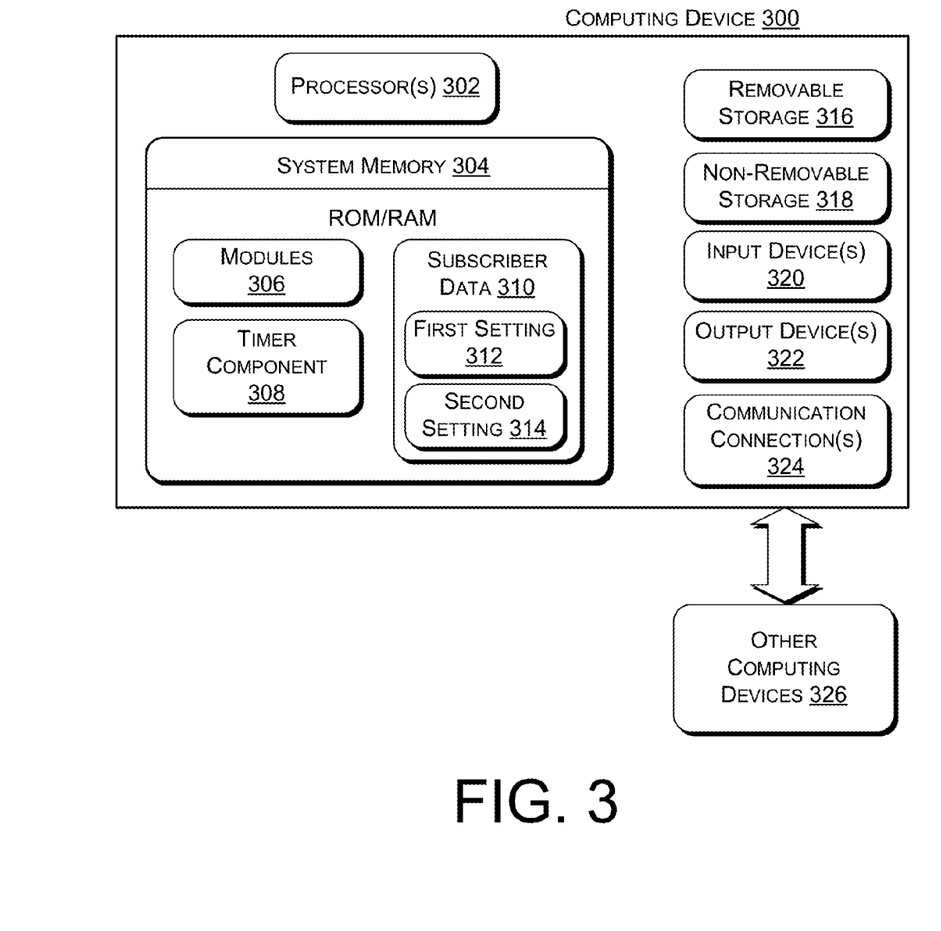
FIG. 3 illustrates an example system architecture of a device associated with a subscriber database of a telecommunications network, such as the device of FIGS. 1 and 2.

FIG. 3 illustrates an example system architecture of a computing device 300, such as a system architecture of the HLR/HSS 104 or a system architecture of the HLR/HSS 208, in accordance with various embodiments. As illustrated, the computing device 300 includes processor(s) 302 and a system memory 304 storing modules 306, a timer component 308, and subscriber data 310 which includes at least a first setting 312 and a second setting 314. The computing device 300 also includes a removable storage 316, a non-removable storage 318, input device(s) 320, output device(s) 322, and communication connections 324 for communicating with other computing devices 326.

In some embodiments, the processor(s) 302 is a central processing unit (CPU), a graphics processing unit (GPU), or both CPU and GPU, or other processing unit or component known in the art.

In various embodiments, system memory 304 is volatile (such as RAM), non-volatile (such as ROM, flash memory, etc.) or some combination of the two. Example system memory 304 may include one or more of RAM, ROM, EEPROM, a Flash Memory, a miniature hard drive, a memory card, an optical storage, a magnetic cassette, a magnetic tape, a magnetic disk storage or another magnetic storage device, or any other medium.

As previously mentioned, the system memory 304 stores modules 306, a timer component 308, and subscriber data 310. The modules 306, timer component 308, and subscriber data 310 may comprise any one or more modules, applications, processes, threads, classes, algorithms, data structures, files, and/or databases, such as the modules, applications, processes, threads, classes, algorithms, data structures, files, and/or databases utilized in performing the operations described above, some part of which are illustrated in FIGS. 1-2 and 4.

For example, the modules 306 may include one or more modules for any or all of receiving SRI-SM messages, determining whether user devices are associated with IMS registrations, determining which IP-SM-GWs to use, adjusting settings based on the timer component 308, sending SRI-SM messages to IP-SM-GWs, processing SRI-SM messages, or responding to SRI-SM messages. The timer component 308 may track times since most recent IMS registrations for user devices. The subscriber data 310 may include at least a first setting 312 and a second setting 314 for each user device. The first setting 312 may be indicative of whether the user device is associated with an IMS registration. The second setting 314 may indicate whether a preconfigured IP-SM-GW or the IP-SM-GW that the user device is registered at should be used. The first setting 312 and second setting 314 may be flags or binary values.

The computing device 300 includes data storage devices (removable and/or non-removable) in addition to the system memory 304, such as, for example, magnetic disks, optical disks, or tape. Such additional storage is illustrated in FIG. 3 by removable storage 316 and non-removable storage 318. Computer storage media may include volatile and nonvolatile, removable and non-removable media implemented in any method or technology for storage of information, such as computer readable instructions, data structures, program modules, or other data. System memory 304, removable storage 316, and non-removable storage 318 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 300. Any such computer-readable storage media may be part of the computing device 300.

In various embodiment, any or all of system memory 304, removable storage 316, and non-removable storage 318 store programming instructions which, when executed, implement some or all of the above-described operations of the computing device 300.

The computing device 300 may also have input device(s) 320, such as a keyboard, a mouse, a touch-sensitive display, voice input device, etc., and output device(s) 322 such as a display, speakers, a printer, etc. These devices are well known in the art and need not be discussed at length here.

The computing device 300 also contains communication connections 324 that allow the computing device 300 to communicate with other computing devices 326, such as the SMSC 102, IP-SM-GW 106, preconfigured IP-SM-GW 116, registered IP-SM-GW 118, SMSC 206, preconfigured IP-SM-GW 210, or registered IP-SM-GW 212.

Example Operations

Figure 4:
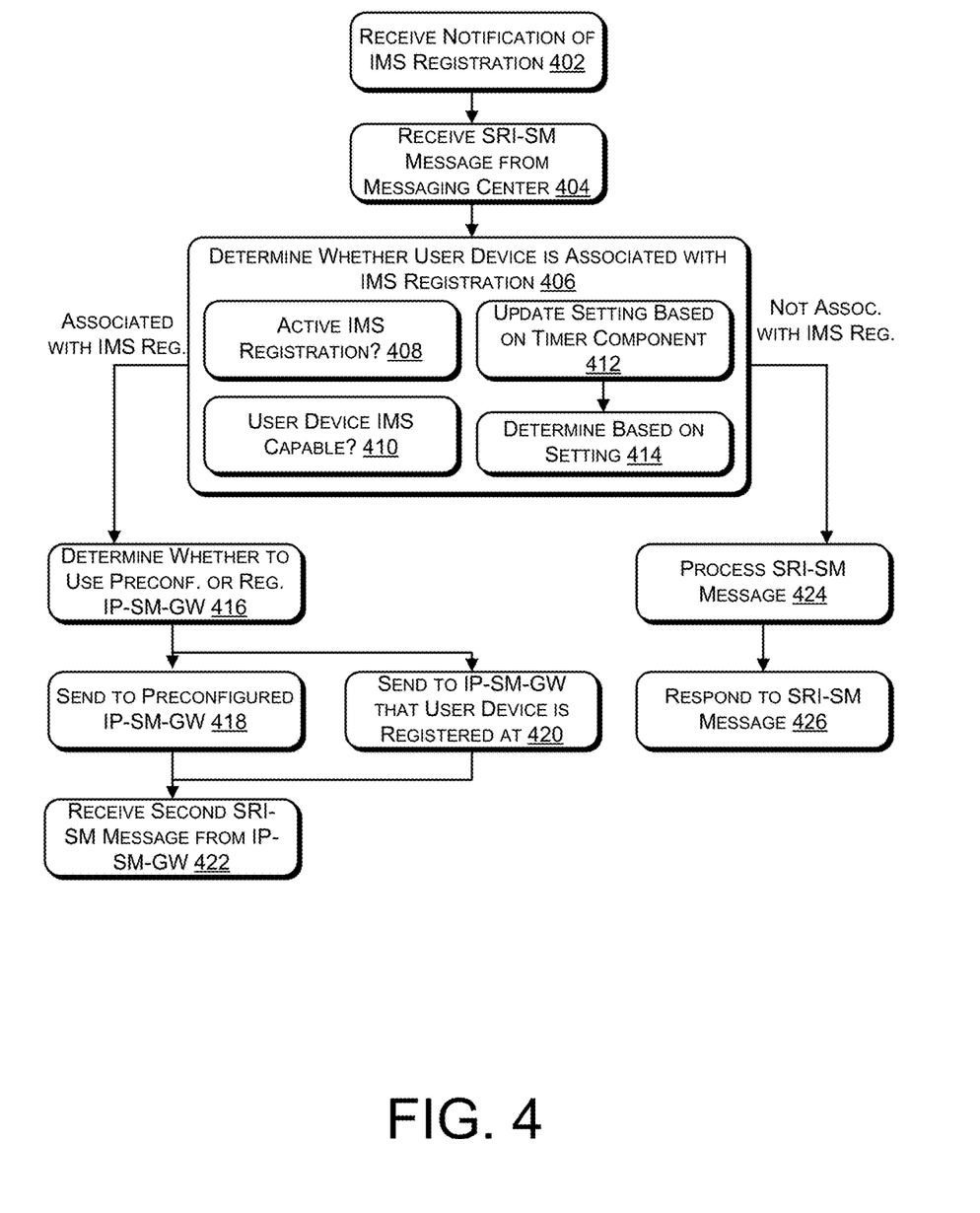
FIG. 4 illustrates an example process for receiving an SRI-SM message from a messaging center, determining whether a user device specified by the SRI-SM message is associated with an IMS registration, and, based on the determination, either processing the SRI-SM message and responding to it or sending the SRI-SM message to an IP-SM-Gateway.

FIG. 4 illustrates an example processes. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process for receiving an SRI-SM message from a messaging center, determining whether a user device specified by the SRI-SM message is associated with an IMS registration, and, based on the determination, either processing the SRI-SM message and responding to it or sending the SRI-SM message to an IP-SM-Gateway. As shown at block 402, a device associated with a subscriber database of the telecommunications network may receive notification of an IMS registration associated with a user device. The device may then update a setting indicative of whether or not the user device is associated with an IMS registration and may also, in some embodiments, restart a timer component. The device may be a HLR, a HSS, or any type of device associated with a subscriber database.

At block 404, the device may receive a SRI-SM message from a messaging center, such as an SMSC.

At block 406, the device may determine whether a user device specified in the SRI-SM message is associated with an IMS registration. At 408, this determining may include determining whether the user device specified in the SRI-SM message is associated with an active IMS registration. At 410, the determining may include determining whether the user device is IMS capable. At 412, either as part of the determining at 406 or at any time, the device may update a setting based on the timer component. The setting may be indicative of whether the user device specified in the SRI-SM message is associated with an IMS registration. For example, if more than a threshold amount of time has past since a most recent IMS registration, the device may update the setting to indicate that the user device is not associated with an IMS registration. The most recent IMS registration may be a most recent IMS registration of the user device or of a group which includes a user associated with the user device. At 414, the determining may include determining whether the user device specified in the SRI-SM message is associated with an IMS registration based on the setting.

At 416, in response to determining that the user device is associated with an IMS registration, the device may then determine, based on another setting, whether to use a pre-configured IP-SM-GW or the IP-SM-GW that the user device is registered at. The other setting may apply globally, per subscriber, or per subscriber group. At 418, if the device determines that the pre-configured IP-SM-GW should be used, the device sends the SRI-SM message to the pre-configured IP-SM-GW. At 420, if the device determines that the IP-SM-GW that the user is registered at should be used, the device sends the SRI-SM message to the IP-SM-GW that the user is registered at. At 422, the device may then receive, in response to the sending at 418 or 420, another SRI-SM message from the IP-SM-GW when the IP-SM-GW is unaware of an IMS registration associated with the user device or when there is a delivery failure.

At 424, in response to determining that the user device is associated with an IMS registration, the device may then process the SRI-SM message and, at 426, respond to the SRI-SM message.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. One or more non-transitory computer-readable media having stored thereon computer executable instructions for programming a device associated with a subscriber database of a telecommunications network to perform operations comprising:
   receiving a Send Routing Information for Short Message (SRI-SM) message from a messaging center;
   determining whether a user device specified by the SRI-SM message is associated with an active Internet Protocol (IP) Multimedia Subsystem (IMS) registration based at least in part on a first setting, the first setting indicating whether the user device is not associated with an IMS registration based at least in part on a threshold amount of time passing since a most recent IMS registration;
   in response to determining that the user device is associated with an active IMS registration:
      determining whether to send the SRI-SM message to a preconfigured IP Short Message Gateway (IP-SM-GW) or to an IP-SM-GW that the user device is registered with based at least in part on a second setting, wherein the second setting applies per subscriber group; and
      sending the SRI-SM message to the determined IP-SM-GW; and
   in response to determining that the user device is not associated with an active IMS registration:
      determining a location of the user device without sending the SRI-SM message to the preconfigured IP-SM-GW or the IP-SM-GW; and
      sending a response to the messaging center, the response including the location of the user device.

2. The one or more non-transitory computer-readable media of claim 1, wherein the device associated with the subscriber database is a home location register (HLR) of the telecommunications network or a home subscriber server (HSS) of the telecommunications network.

3. The one or more non-transitory computer-readable media of claim 1, wherein the messaging center is a short message service center (SMSC).

4. A computer-implemented method comprising:
   receiving a Send Routing Information for Short Message (SRI-SM) message from a messaging center;
   determining whether a user device specified by the SRI-SM message is associated with an Internet Protocol (IP) Multimedia Subsystem (IMS) registration based at least in part on a first setting, the first setting indicating that the user device is not associated with an IMS registration based at least in part on a threshold amount of time passing since a most recent IMS registration;
   in response to determining that the user device is associated with an IMS registration:
      determining whether to send the SRI-SM message to a preconfigured IP Short Message Gateway (IP-SM-GW) or to an IP-SM-GW that the user device is registered with based at least in part on a second setting, wherein the second setting applies per subscriber group; and sending the SRI-SM message to the determined IP-SM-GW;

in response to determining that the user device is not associated with an IMS registration:

determining a location of the user device without sending the SRI-SM message to the preconfigured IP-SM-GW or the IP-SM-GW; and sending a response to the messaging center, the response including the location of the user device.

5. The method of claim 4, wherein the IMS registration is an active IMS registration.

6. The method of claim 4, wherein the determining whether the user device is associated with an IMS registration comprises determining that the user device is an IMS capable device.

7. The method of claim 4, further comprising receiving a second SRI-SM message from the IP-SM-GW when the IP-SM-GW is unaware of an IMS registration associated with the user device or when there is a delivery failure.

8. The method of claim 4, wherein the receiving, the determining, the sending, the processing, and the responding are performed by a device associated with a subscriber database of a telecommunications network, and the device is a home location register (HLR) of the telecommunications network or a home subscriber server (HSS) of the telecommunications network.

9. The method of claim 4, wherein the messaging center is a short message service center (SMSC).

10. A device associated with a subscriber database of a telecommunications network, the device comprising:

a processor;

computer storage media storing computer-executable instructions that, when executed on the processor, cause the processor to perform operations comprising:

receiving a Send Routing Information for Short Message (SRI-SM) message from a messaging center;

determining whether a user device specified by the SRI-SM message is associated with an Internet Protocol (IP) Multimedia Subsystem (IMS) registration based at least in part on a first setting, the first setting indicating that the user device is not associated with an IMS registration based at least in part on a threshold amount of time passing since a most recent IMS registration;

in response to determining that the first setting indicates that the user device is associated with the IMS registration:

determining, based on a second setting, whether to send the SRI-SM message to a preconfigured IP Short Message Gateway (IP-SM-GW) or to an IP-SM-GW that the user device is registered with; and sending the SRI-SM message based on the determining, wherein the second setting applies per subscriber group; and in response to determining that the first setting indicates that the user device is not associated with an IMS registration:

determining a location of the user device without sending the SRI-SM message to the preconfigured IP-SM-GW or the IP-SM-GW; and sending a response to the messaging center, the response including the location of the user device.

11. The device of claim 10, wherein the most recent IMS registration relates to the IMS registration of the user device or of a group which includes a user associated with the user device.

12. The device of claim 10, wherein the operations further comprise:

receiving notification of the IMS registration;

updating the first setting to indicate that the user device is associated with the IMS registration; and restarting the time period.

13. The device of claim 10, wherein the device is a home location register (HLR) of the telecommunications network or a home subscriber server (HSS) of the telecommunications network.

14. The device of claim 10, wherein the messaging center is a short message service center (SMSC).

* * * * *